L. A. SORBY.
ADJUSTABLE SCALE HOLDER.
APPLICATION FILED MAY 9, 1918.

1,289,946.

Patented Dec. 31, 1918.

Inventor.
Lawrence A. Sorby
by Heard Smith & Tennant.
Attys.

UNITED STATES PATENT OFFICE.

LAWRENCE A. SORBY, OF ARLINGTON, MASSACHUSETTS.

ADJUSTABLE SCALE-HOLDER.

1,289,946.

Specification of Letters Patent.

Patented Dec. 31, 1918.

Application filed May 9, 1918. Serial No. 233,469.

*To all whom it may concern:*

Be it known that I, LAWRENCE A. SORBY, a citizen of the United States, and resident of Arlington, county of Middlesex, State of Massachusetts, have invented an Improvement in Adjustable Scale-Holders, of which the following description, in connection with the accompanying drawing, is a specification, like characters on the drawing representing like parts.

This invention relates to improvements in scale holders particularly such as are used for laying out work on a laying out table and the object thereof is to produce a scale holder in which the position of the scale may be adjusted relatively to the plane of the laying-out table whereby a major graduation of said scale may be set at a predetermined position upon the work being laid out and measurements made therefrom without the necessity of computing the distance of such centers or lines from the plane of the laying-out table.

In laying out many pieces of work, such for example, as the valve ports for engine cylinders, a center and a center line are first established and other lines and centers laid out from the main center and center line. In laying out these other centers and lines upon the work however the measurements are also made from the surface of the laying-out table to the point or line to be traced upon the work. This requires considerable calculation and almost always the computation of fractions of the notation in which the scale is graduated.

By the use of the present invention the center or center line may be obtained in the usual manner. The scale may then be adjusted to zero or one of its major divisions and other lines established by a direct reading upon the scale and without the necessity of computing the height of the center or line which is being established from the plane of the laying-out table, or by the slow, difficult and inaccurate method of applying the scale to the work by hand. Thus a great deal of time may be saved in laying out the work and errors which might arise from erroneous calculations eliminated.

Another feature of the invention is to provide an adjustable scale holder of the class described which is adapted for exceedingly large work but which also may be employed in laying out work of any size.

Another object of the invention is to provide an adjustable scale holder of the character described with means for adjustably securing the scale thereto so that scales having different graduations and different indicia may be used. For example, in laying out the ports for the slide valves of engines the relative positions of the edges of the ports may be charted upon paper, zinc or other suitable material and the chart clamped to the scale or scale holder and by adjusting the scale holder the center line of the diagram thus laid out may be caused to coincide with the location of the center line upon the work. Thereafter the positions of the lines representing the edges of the ports may be laid out directly from the chart carried by the scale holder.

Other objects and features of the invention will more fully appear from the following description and the accompanying drawings and will be pointed out in the annexed claims.

Figure 1:
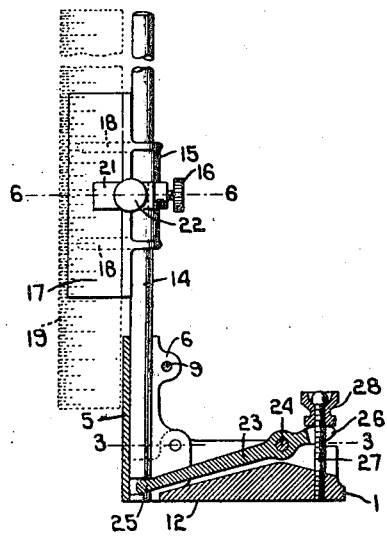
Figure 1 is a view partly in side elevation and partly in median vertical section of a surface gage scale holder embodying a preferred form of my invention.
Figure 2:
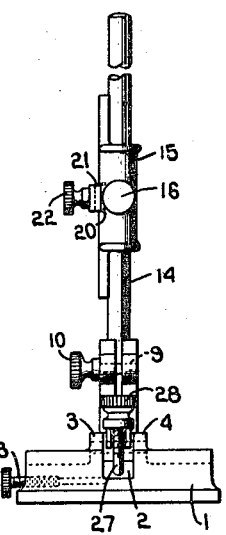
Fig. 2 is a rear elevation of the same.
Figure 3:
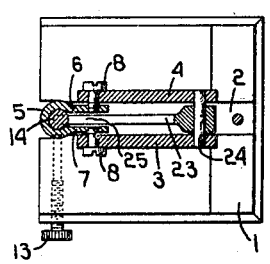
Fig. 3 is a plan view partly in section on lines 3—3 Fig. 1.

The surface gage scale holder illustrated in Figs. 1, 2 and 3 comprises a base 1 having a carefully surfaced flat bottom adapted to contact throughout its area with the flat surface of a laying out table.

The base 1 preferably is provided with a longitudinal groove 2 and with upwardly extending bosses 3 and 4 forming the walls of said groove. A guiding member 5 which desirably may be of partially tubular form having parallel flanges 6 and 7 is pivotally connected to the base by screws 8 passing through the flanges 6 and 7 and the bosses 3 and 4 upon said base. By reason of this pivotal construction the guiding member 5 may be folded down upon the base so that the device can conveniently be placed in a tool box or packed for shipment. A set screw 9 having a milled head 10 may also be provided for the purpose of drawing the flanges 6, 7 together to clamp the scale support or standard in said guiding member.

The guiding member may conveniently be held in a position normal to the supporting plane 12 of the base by a screw 13 passing through the wall of said base and engaging an aperture in the lower portion of said guiding member. The scale support or standard may be of any desired form. As illustrated in Figs. 1, 2 and 3 it is in the form of a cylindrical rod 14, which is seated in a corresponding guideway in the guiding member 5 and is provided with an adjustable bracket 15 having means for detachably supporting a scale. The bracket 15 preferably comprises a cylindrical sleeve slidably mounted upon the rod or standard 14 and adapted to be adjustably secured thereto by a set screw 16. The bracket 15 is also provided with a laterally extending plate 17 which preferably is strengthened by webs 18.

The scale 19 may be clamped against the plate 17 in any desired manner. As illustrated herein the bracket 15 is provided with a laterally extending boss 20 and an L-shaped clamping member 21 which fits over a shoulder on the boss 20 and is secured to it by a set screw 22. When the scale is to be fixed to the bracket it is placed upon the plate 17 of the bracket 15 beneath the clamping member 21 and the screw 22 set up until the clamping member 21 forces the scale against the plate 17 with sufficient force to retain the scale firmly in position.

Any suitable means may be provided for accurately adjusting the standard 14 vertically so that the scale may be raised from and lowered toward the supporting plane of the base 1 which of course coincides with the surface of the laying-out table. The preferred means which is illustrated herein comprises a lever 23 which is mounted upon a pivot 24 journaled in the bosses 3, 4 which extend upwardly from the base. The lever 23 preferably is formed with arms of unequal length, the end 25 of the longer arm extending into the slotted end of the scale support 14 or otherwise engaging it. The opposite or shorter arm of the lever 23, desirably is bifurcated at its end 26 to embrace a screw 27 extending upwardly from the base 1.

The screw 27 has a nut 28 with a knurled head to engage the bifurcated portion 26 of the lever 23. By adjusting the nut 28 the scale support 14 may be raised in such a manner that the scale may be very accurately positioned with reference to the work. In the use of the device the usual measurement may be made from the surface of the laying-out table to locate the center line upon the work to be laid out. The bracket 15 may then be roughly adjusted to bring the scale 19 in a suitable position for use in connection with the work. Then by turning the nut 28 the scale support 14 and scale may be raised until one of the major graduations of the scale is accurately positioned upon the center or center line of the work. The distance of the other points and lines upon the work may then be read directly upon the scale and marked in the usual manner but without the necessity of computing the distance of such points and lines from the surface of the laying-out table.

Figure 4:
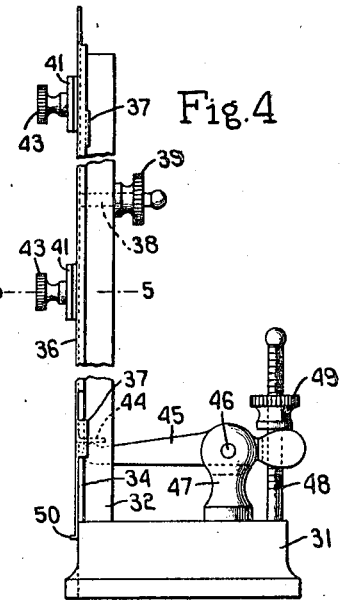
Fig. 4 is a side elevation of a modified form of adjustable surface gage scale holder embodying my invention and, Fig. 5 is a transverse sectional view on lines 5—5 Fig. 4, and, Fig. 6 is a transverse sectional view on lines 6—6 Fig. 1.
Figure 5:
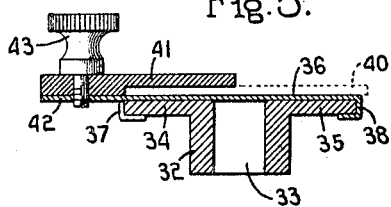
Figure 6:
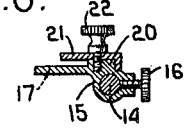

Another embodiment of the invention which is particularly adapted for large work is illustrated in Figs. 4 and 5. The surface gage scale holder illustrated in these figurse comprises a base 31 having a vertical guide 32 having a longitudinal slot 33. The guiding member 32 preferably has lateral extensions or flanges 34, 35 and a scale support 36 corresponding functionally to the standard 14 is slidably secured to these flanges. A convenient form of scale support which is illustrated herein comprises a flat plate having ears 37 embracing the edges of the flanges 34, 35 of the guide 32. The scale support 36 desirably is provided with one or more screw threaded studs 38 extending through the slot 33 of the grinding member 32 and provided with a nut 39 adapted to clamp the scale support in its adjusted position. The scale 40 (illustrated in dotted lines in Fig. 5) may be fastened to the scale support by a clamping plate 41 secured to an extension 42 of said scale support by a set screw 43.

Where a long scale is used in laying out large work two or more of these clamping devices should be used in order that the scale may be firmly secured in place and prevented from bending. The lower end of the scale support 36 may be provided with a lateral extension or lug 44 which may be engaged by one arm of a lever 45 fulcrumed upon a pivot 46 in a stand 47 extending upwardly from the base 41. The opposite end of the lever 45 is bifurcated to embrace a screw 48 which extends upwardly from the base and is provided with a nut 49 adapted to engage the bifurcated end of the lever 45 so that by adjusting the nut 49 the scale may be set at any desired position. The scale holder may be provided at its lower end with a projecting lug or flange 50 to support the lower end of the scale.

The means for clamping the scale upon the scale support preferably is of such a character as to leave the graduated side of the scale which is to be applied to the work free so that it may be placed closely against the work to be laid out. Such a clamping means will also permit a chart to be secured to the scale holder, either in connection with the scale or independently thereof so that the laying out of the work may be greatly facilitated, particularly where a large number of pieces are to be laid out upon the same design.

It is to be understood that the embodiments of the invention disclosed herein are illustrative and not restrictive and that various modifications may be made within the meaning and scope of the following claims.

Having thus described my invention what I claim as new and desire to secure by Letters Patent is:

1. A scale holder comprising a base, a scale support, a scale upon said scale support presenting a graduated free edge adapted to be placed in juxtaposition to the work, and means for adjusting the position of said scale relatively to the supporting plane of said base whereby a major graduation of said scale may be set at a predetermined position upon the work and measurements made therefrom in laying out the work without the necessity of computing the distances of points and lines from the plane of the base.

2. A scale holder comprising a base, a standard, a scale, means for adjustably securing said scale to said standard and means for adjusting said standard relatively to the supporting plane of said base whereby a major graduation of said scale may be set at a predetermined position upon the work and measurements made therefrom in laying out the work without the necessity of computing the distances of points and lines from the plane of the base.

3. A scale holder comprising a base, a guiding member normal to the supporting plane of said base, a scale support adapted to hold the scale in vertical position to present a graduated free edge slidably mounted upon said guiding member and means for adjusting the scale support upon said guiding member.

4. A scale holder comprising a base, a guiding member pivotally mounted on said base and adapted to be folded down upon the same, means for securing said guiding member in a position normal to the supporting plane of said base, a standard slidably mounted upon said guiding member, means for securing a scale to said standard and means for adjusting said standard upon said guiding member.

5. A scale holder as defined in claim 4 in which the means for adjusting said standard upon said guiding member includes a lever pivotally mounted upon said base and having one end engaging said standard and means for adjusting the other end of said lever.

6. A scale holder as defined in claim 4 in which the means for adjusting said standard upon said guiding member includes a lever pivotally mounted upon said base having one end engaging said standard, and having the opposite end bifurcated, a screw connected to said base and extending within said bifurcation and a thumb nut for said screw adapted to engage the bifurcated end of said lever.

In testimony whereof, I have signed my name to this specification.

LAWRENCE A. SORBY.

Copies of this patent may be obtained for five cents each, by addressing the "Commissioner of Patents, Washington, D. C."